(12) United States Patent
Kawaguchi et al.

(10) Patent No.: US 9,717,986 B1
(45) Date of Patent: Aug. 1, 2017

(54) SYSTEM AND METHOD FOR PROVIDING A QUEST FROM A PROBABILITY ITEM BUNDLE IN AN ONLINE GAME

(71) Applicant: KABAM, INC., San Francisco, CA (US)

(72) Inventors: Brent Jason Kawaguchi, Alameda, CA (US); Hannah Won Lee, San Francisco, CA (US); Peter Im, San Bruno, CA (US)

(73) Assignee: Kabam, Inc., San Francisco, CA (US)

( * ) Notice: Subject to any disclaimer, the term of this patent is extended or adjusted under 35 U.S.C. 154(b) by 584 days.

(21) Appl. No.: 14/308,763

(22) Filed: Jun. 19, 2014

(51) Int. Cl.
*A63F 13/12* (2006.01)
*A63F 13/30* (2014.01)

(52) U.S. Cl.
CPC .................................. *A63F 13/12* (2013.01)

(58) Field of Classification Search
None
See application file for complete search history.

(56) References Cited

U.S. PATENT DOCUMENTS

| 5,816,918 | A | 10/1998 | Kelly et al. ................ 463/16 |
| 5,933,813 | A | 8/1999 | Teicher | |
| 5,964,660 | A | 10/1999 | James | |
| 6,142,472 | A | 11/2000 | Kliebisch | |
| 6,190,225 | B1 | 2/2001 | Coleman | |
| 6,190,255 | B1 | 2/2001 | Thomas et al. ............. 463/20 |
| 6,306,033 | B1 | 10/2001 | Niwa et al. ................ 463/1 |
| 6,347,996 | B1 | 2/2002 | Gilmore et al. ............ 463/17 |
| 6,402,619 | B1 | 6/2002 | Sato | |
| 6,561,904 | B2 | 5/2003 | Locke et al. ............... 463/25 |

(Continued)

FOREIGN PATENT DOCUMENTS

| KR | 1020130137431 | 12/2013 |
| WO | WO 02/26333 | 4/2002 |

(Continued)

OTHER PUBLICATIONS

"Building Structures". War2.warcraft.org. Online. Accessed via the Internet. Accessed Aug. 9, 2014. <URL: http://war2.warcraft.org/strategy/verybasics/building.shtml>, 3 pages.

(Continued)

*Primary Examiner* — Milap Shah
*Assistant Examiner* — Robert T Clarke, Jr.
(74) *Attorney, Agent, or Firm* — Sheppard Mullin Richter & Hampton LLP

(57) ABSTRACT

A system and method for providing a quest from a probability item bundle in an online game. The system and method include executing an instance of an online game. The system and method include maintaining inventories of virtual items, and presenting offers to sell probability item bundles. The system and method include associating potential awards in sets of potential awards with different award distribution probabilities. The system and method include receiving activation requests from users for purchased probability item bundles. The system and method include stochastically selecting one of the potential awards in accordance with the award distribution probabilities and providing access to a first quest in an online game in accordance with the selected award.

20 Claims, 7 Drawing Sheets

(56) References Cited

U.S. PATENT DOCUMENTS

| | | | |
|---|---|---|---|
| 6,604,008 B2 | 8/2003 | Chudley | |
| 6,607,437 B2 | 8/2003 | Casey et al. | 463/16 |
| 6,745,236 B1 | 6/2004 | Hawkins | |
| 6,811,483 B1 | 11/2004 | Webb | |
| 6,811,484 B2 | 11/2004 | Katz et al. | 463/17 |
| 6,850,900 B1 | 2/2005 | Hare | |
| 6,928,474 B2 | 8/2005 | Venkatesan | |
| 7,050,868 B1 | 5/2006 | Graepel | 700/93 |
| 7,076,453 B2 | 7/2006 | Jammes | |
| 7,136,617 B2 | 11/2006 | Libby | 434/350 |
| 7,156,733 B2 | 1/2007 | Chiang et al. | 463/1 |
| 7,192,352 B2 | 3/2007 | Walker et al. | 463/42 |
| 7,326,115 B2 | 2/2008 | Baerlocher | 463/25 |
| 7,381,133 B2 | 6/2008 | Thomas | 463/20 |
| 7,455,586 B2 | 11/2008 | Nguyen et al. | 463/16 |
| 7,533,336 B2 | 5/2009 | Jaffe | |
| 7,660,740 B2 | 2/2010 | Boone | |
| 7,682,239 B2 | 3/2010 | Friedman et al. | 463/16 |
| 7,749,056 B2 | 7/2010 | Ando et al. | 463/6 |
| 7,785,188 B2 | 8/2010 | Cannon | 463/20 |
| 7,813,821 B1 | 10/2010 | Howell | 700/91 |
| 7,819,749 B1 | 10/2010 | Fish et al. | 463/42 |
| 7,945,802 B2 | 5/2011 | Hamilton, II et al. | 713/500 |
| 7,959,507 B2 | 6/2011 | Cannon | 463/21 |
| 8,010,404 B1 | 8/2011 | Wu et al. | 705/10 |
| 8,016,668 B2 | 9/2011 | Hardy | |
| 8,047,909 B2 | 11/2011 | Walker et al. | 463/16 |
| 8,057,294 B2 | 11/2011 | Pacey et al. | 463/20 |
| 8,066,571 B2 | 11/2011 | Koster et al. | 463/42 |
| 8,147,340 B2 | 4/2012 | Brunet de Courssou et al. | 463/42 |
| 8,157,635 B2 | 4/2012 | Hardy | |
| 8,187,101 B2 | 5/2012 | Herrmann | |
| 8,226,472 B2 | 7/2012 | Van Luchene | |
| 8,231,453 B2 | 7/2012 | Wolf et al. | 463/20 |
| 8,231,470 B2 | 7/2012 | Feeney et al. | 463/42 |
| 8,239,487 B1 | 8/2012 | Hoffman et al. | 709/218 |
| 8,246,439 B2 | 8/2012 | Kelly et al. | 463/20 |
| 8,272,934 B2 | 9/2012 | Olive et al. | 463/16 |
| 8,272,951 B2 | 9/2012 | Ganz | 463/29 |
| 8,272,956 B2 | 9/2012 | Kelly | |
| 8,282,491 B2 | 10/2012 | Auterio | |
| 8,287,367 B2 | 10/2012 | Hall et al. | 463/29 |
| 8,287,383 B1 | 10/2012 | Etter | |
| 8,287,384 B2 | 10/2012 | Auterio | |
| 8,292,743 B1 | 10/2012 | Etter | |
| 8,313,372 B2 | 11/2012 | Naicker et al. | 463/25 |
| 8,317,584 B2 | 11/2012 | Aoki et al. | 463/13 |
| 8,317,601 B1 | 11/2012 | Luciano, Jr. | 463/25 |
| 8,323,110 B2 | 12/2012 | Shibamiya et al. | 463/42 |
| 8,328,642 B2 | 12/2012 | Mosites et al. | 463/42 |
| 8,332,260 B1 | 12/2012 | Mysen | |
| 8,332,544 B1 | 12/2012 | Ralls et al. | 710/8 |
| 8,348,716 B2 | 1/2013 | Ganz et al. | 446/175 |
| 8,348,762 B2 | 1/2013 | Willis | 463/42 |
| 8,348,767 B2 | 1/2013 | Mahajan | |
| 8,348,768 B2 | 1/2013 | Auterio et al. | 463/42 |
| 8,360,858 B2 | 1/2013 | LaRocca | |
| 8,360,867 B2 | 1/2013 | VanLuchene | |
| 8,360,868 B2 | 1/2013 | Shvili | 463/27 |
| 8,366,544 B2 | 2/2013 | Walker | |
| 8,366,550 B2 | 2/2013 | Herrmann et al. | 463/42 |
| 8,371,925 B2 | 2/2013 | Bonney et al. | 463/20 |
| 8,376,826 B2 | 2/2013 | Katz et al. | 463/16 |
| 8,382,572 B2 | 2/2013 | Hoffman | 463/20 |
| 8,388,427 B2 | 3/2013 | Yariv | 463/9 |
| 8,401,913 B2 | 3/2013 | Alivandi | |
| 8,408,989 B2 | 4/2013 | Bennett et al. | 463/20 |
| 8,409,015 B2 | 4/2013 | Van Luchene | 463/42 |
| 8,439,759 B1 | 5/2013 | Mello et al. | 463/42 |
| 8,475,262 B2 | 7/2013 | Wolf et al. | 463/20 |
| 8,506,394 B2 | 8/2013 | Kelly et al. | 463/29 |
| 8,512,150 B2 | 8/2013 | Hermann | 463/43 |
| 8,583,266 B2 | 11/2013 | Herbrich et al. | 700/93 |
| 8,636,591 B1* | 1/2014 | Hawk | G07F 17/3244 463/16 |
| 8,777,754 B1 | 7/2014 | Santini et al. | 463/42 |
| 8,784,214 B2 | 7/2014 | Parks et al. | 463/42 |
| 8,790,185 B1 | 7/2014 | Caldarone et al. | 463/42 |
| 8,821,260 B1 | 9/2014 | DeSanti | |
| 8,831,758 B1 | 9/2014 | Chu et al. | 700/91 |
| 8,851,978 B1 | 10/2014 | Koh | |
| 8,920,243 B1 | 12/2014 | Curtis | |
| 8,961,319 B1 | 2/2015 | Pieron | |
| 8,968,067 B1 | 3/2015 | Curtis | |
| 9,138,639 B1 | 9/2015 | Ernst | |
| 9,257,007 B2 | 2/2016 | Santini | |
| 2002/0059397 A1 | 5/2002 | Feola | |
| 2002/0072412 A1 | 6/2002 | Young et al. | 463/42 |
| 2002/0094863 A1 | 7/2002 | Klayh | 463/21 |
| 2002/0095327 A1 | 7/2002 | Zumel | |
| 2002/0115488 A1 | 8/2002 | Berry et al. | 463/42 |
| 2002/0119824 A1 | 8/2002 | Allen | 463/42 |
| 2002/0165794 A1 | 11/2002 | Ishihara | |
| 2002/0183105 A1 | 12/2002 | Cannon et al. | 463/16 |
| 2002/0193162 A1 | 12/2002 | Walker et al. | 463/42 |
| 2003/0008713 A1 | 1/2003 | Ushiro et al. | 463/42 |
| 2003/0027619 A1 | 2/2003 | Nicastro, Sr. | 463/16 |
| 2003/0032476 A1 | 2/2003 | Walker | |
| 2003/0102625 A1 | 6/2003 | Katz et al. | 273/138.1 |
| 2003/0109301 A1 | 6/2003 | Chudley et al. | 463/23 |
| 2003/0157978 A1 | 8/2003 | Englman | |
| 2003/0174178 A1 | 9/2003 | Hodges | |
| 2003/0190960 A1 | 10/2003 | Jokipii et al. | 463/42 |
| 2003/0216167 A1 | 11/2003 | Gauselmann | |
| 2004/0002387 A1 | 1/2004 | Grady | |
| 2004/0068451 A1 | 4/2004 | Lenk | |
| 2004/0215524 A1 | 10/2004 | Parkyn | |
| 2004/0224745 A1 | 11/2004 | Bregenzer | |
| 2004/0225387 A1 | 11/2004 | Smith, III | 700/92 |
| 2004/0267611 A1 | 12/2004 | Hoerenz | |
| 2005/0096117 A1 | 5/2005 | Katz et al. | 463/17 |
| 2005/0114223 A1 | 5/2005 | Schneider | |
| 2005/0165686 A1 | 7/2005 | Zack | |
| 2005/0192087 A1 | 9/2005 | Friedman et al. | 463/25 |
| 2005/0209008 A1 | 9/2005 | Shimizu et al. | 463/43 |
| 2005/0227751 A1 | 10/2005 | Zanelli et al. | 463/1 |
| 2005/0255914 A1 | 11/2005 | McHale | |
| 2005/0277474 A1 | 12/2005 | Barry | 463/42 |
| 2006/0030407 A1 | 2/2006 | Thayer | |
| 2006/0063587 A1 | 3/2006 | Manzo | 463/25 |
| 2006/0116196 A1 | 6/2006 | Vancura | 463/20 |
| 2006/0155597 A1 | 7/2006 | Gleason | |
| 2006/0200370 A1 | 9/2006 | Ratliff | |
| 2006/0217198 A1 | 9/2006 | Johnson | 463/40 |
| 2006/0287029 A1 | 12/2006 | Yoshinobu et al. | 463/9 |
| 2006/0287102 A1 | 12/2006 | White et al. | 463/42 |
| 2007/0021213 A1 | 1/2007 | Foe et al. | 463/42 |
| 2007/0077988 A1 | 4/2007 | Friedman | |
| 2007/0111770 A1 | 5/2007 | Van Luchene | 463/7 |
| 2007/0129139 A1 | 6/2007 | Nguyen et al. | 463/25 |
| 2007/0129147 A1 | 6/2007 | Gagner | 463/42 |
| 2007/0191101 A1 | 8/2007 | Coliz et al. | 463/42 |
| 2007/0191102 A1 | 8/2007 | Coliz et al. | 463/42 |
| 2007/0213116 A1 | 9/2007 | Crawford et al. | 463/16 |
| 2007/0281285 A1 | 12/2007 | Jayaweera | |
| 2008/0032787 A1 | 2/2008 | Low | |
| 2008/0058092 A1 | 3/2008 | Schwartz et al. | 463/25 |
| 2008/0113706 A1 | 5/2008 | O'Halloran | 463/16 |
| 2008/0113815 A1 | 5/2008 | Weingardt | |
| 2008/0124353 A1 | 5/2008 | Brodeur | |
| 2008/0154798 A1 | 6/2008 | Valz | |
| 2008/0171599 A1 | 7/2008 | Salo et al. | 463/41 |
| 2008/0194318 A1 | 8/2008 | Kralicky | |
| 2008/0200260 A1 | 8/2008 | Deng | 463/42 |
| 2008/0207306 A1 | 8/2008 | Higbie | 463/23 |
| 2008/0214295 A1 | 9/2008 | Dabrowski | |
| 2008/0227525 A1 | 9/2008 | Kelly et al. | 463/20 |
| 2008/0234043 A1 | 9/2008 | McCaskey | |
| 2008/0248867 A1 | 10/2008 | Englman | |
| 2008/0275786 A1 | 11/2008 | Gluck | |
| 2008/0300045 A1 | 12/2008 | Ratcliff | 463/25 |
| 2008/0318668 A1 | 12/2008 | Ching | |

(56) References Cited

U.S. PATENT DOCUMENTS

| | | |
|---|---|---|
| 2009/0011812 A1 | 1/2009 | Katz |
| 2009/0017886 A1 | 1/2009 | McGucken |
| 2009/0036199 A1 | 2/2009 | Myus |
| 2009/0048918 A1 | 2/2009 | Dawson |
| 2009/0061982 A1 | 3/2009 | Brito |
| 2009/0124353 A1 | 5/2009 | Collette et al. ............... 463/25 |
| 2009/0204907 A1 | 8/2009 | Finn |
| 2009/0210301 A1 | 8/2009 | Porter |
| 2009/0234710 A1 | 9/2009 | Belgaied Hassine |
| 2009/0315893 A1 | 12/2009 | Smith et al. ............... 345/473 |
| 2010/0022307 A1 | 1/2010 | Steuer et al. ............... 463/42 |
| 2010/0035689 A1 | 2/2010 | Altshuler |
| 2010/0041472 A1 | 2/2010 | Gagner |
| 2010/0050088 A1 | 2/2010 | Neustaedter |
| 2010/0070056 A1 | 3/2010 | Coronel ............... 700/91 |
| 2010/0094841 A1 | 4/2010 | Bardwil |
| 2010/0099471 A1 | 4/2010 | Feeney et al. ............... 463/1 |
| 2010/0107214 A1 | 4/2010 | Ganz ............... 726/1 |
| 2010/0113162 A1 | 5/2010 | Vemuri et al. ............... 463/42 |
| 2010/0174593 A1 | 7/2010 | Cao |
| 2010/0198653 A1 | 8/2010 | Bromenshenkel |
| 2010/0210356 A1 | 8/2010 | Losica ............... 463/26 |
| 2010/0227675 A1 | 9/2010 | Luxton et al. ............... 463/25 |
| 2010/0227682 A1 | 9/2010 | Reville et al. ............... 463/29 |
| 2010/0228606 A1 | 9/2010 | Walker |
| 2010/0240444 A1 | 9/2010 | Friedman et al. ............... 463/25 |
| 2010/0241491 A1 | 9/2010 | Eglen |
| 2010/0241492 A1 | 9/2010 | Eglen et al. ............... 705/10 |
| 2010/0306015 A1 | 12/2010 | Kingston ............... 705/8 |
| 2011/0065511 A1 | 3/2011 | Mahan ............... 463/40 |
| 2011/0092271 A1 | 4/2011 | Nguyen |
| 2011/0092273 A1 | 4/2011 | Cerbini |
| 2011/0111841 A1 | 5/2011 | Tessmer ............... 463/25 |
| 2011/0112662 A1 | 5/2011 | Thompson ............... 700/91 |
| 2011/0113353 A1 | 5/2011 | Koh |
| 2011/0118002 A1 | 5/2011 | Aoki |
| 2011/0145040 A1 | 6/2011 | Zahn |
| 2011/0151957 A1 | 6/2011 | Falciglia, Sr. ............... 463/18 |
| 2011/0218033 A1 | 9/2011 | Englman et al. ............... 463/25 |
| 2011/0227919 A1 | 9/2011 | Bongio et al. ............... 345/426 |
| 2011/0256936 A1 | 10/2011 | Walker et al. ............... 463/42 |
| 2011/0263324 A1 | 10/2011 | Ganetakos et al. ............... 463/31 |
| 2011/0275438 A9 | 11/2011 | Hardy et al. ............... 463/42 |
| 2011/0281638 A1 | 11/2011 | Bansi |
| 2011/0281654 A1 | 11/2011 | Kelly et al. ............... 463/42 |
| 2011/0282764 A1 | 11/2011 | Borst |
| 2011/0300923 A1 | 12/2011 | Van Luchene |
| 2011/0319152 A1 | 12/2011 | Ross et al. ............... 463/20 |
| 2011/0319170 A1 | 12/2011 | Shimura et al. ............... 463/42 |
| 2012/0011002 A1 | 1/2012 | Crowe |
| 2012/0015714 A1 | 1/2012 | Ocko et al. ............... 463/25 |
| 2012/0015715 A1 | 1/2012 | Luxton et al. ............... 463/25 |
| 2012/0034961 A1 | 2/2012 | Berman et al. ............... 463/6 |
| 2012/0040743 A1 | 2/2012 | Auterio |
| 2012/0040761 A1 | 2/2012 | Auterio |
| 2012/0042282 A1 | 2/2012 | Wong |
| 2012/0047002 A1 | 2/2012 | Patel |
| 2012/0059730 A1 | 3/2012 | Jensen |
| 2012/0083909 A1 | 4/2012 | Carpenter et al. ............... 700/92 |
| 2012/0101886 A1 | 4/2012 | Subramanian |
| 2012/0108306 A1 | 5/2012 | Munsell |
| 2012/0109785 A1 | 5/2012 | Karlsson |
| 2012/0115593 A1 | 5/2012 | Vann |
| 2012/0122589 A1 | 5/2012 | Kelly |
| 2012/0129590 A1 | 5/2012 | Morrisroe |
| 2012/0130856 A1 | 5/2012 | Petri |
| 2012/0142429 A1 | 6/2012 | Muller |
| 2012/0156668 A1 | 6/2012 | Zelin ............... 434/362 |
| 2012/0157187 A1 | 6/2012 | Moshal ............... 463/25 |
| 2012/0157193 A1 | 6/2012 | Arezina et al. ............... 463/25 |
| 2012/0166380 A1 | 6/2012 | Sridharan |
| 2012/0166449 A1 | 6/2012 | Pitaliya ............... 707/748 |
| 2012/0178514 A1 | 7/2012 | Schulzke ............... 463/17 |
| 2012/0178515 A1 | 7/2012 | Adams et al. ............... 463/17 |
| 2012/0178529 A1 | 7/2012 | Collard |
| 2012/0197874 A1 | 8/2012 | Zatkin |
| 2012/0202570 A1 | 8/2012 | Schwartz et al. ............... 463/10 |
| 2012/0203669 A1 | 8/2012 | Borsch |
| 2012/0215667 A1 | 8/2012 | Ganz |
| 2012/0221430 A1 | 8/2012 | Naghmouchi |
| 2012/0226573 A1 | 9/2012 | Zakas et al. ............... 705/26.2 |
| 2012/0231891 A1 | 9/2012 | Watkins |
| 2012/0244945 A1 | 9/2012 | Kolo et al. ............... 463/42 |
| 2012/0244947 A1 | 9/2012 | Ehrlich ............... 463/42 |
| 2012/0244950 A1 | 9/2012 | Braun ............... 463/42 |
| 2012/0245988 A1 | 9/2012 | Pace |
| 2012/0256377 A1 | 10/2012 | Schneider ............... 273/292 |
| 2012/0282986 A1 | 11/2012 | Castro ............... 463/1 |
| 2012/0289315 A1 | 11/2012 | Van Luchene |
| 2012/0289330 A1 | 11/2012 | Leydon et al. ............... 463/31 |
| 2012/0289346 A1 | 11/2012 | Van Luchene |
| 2012/0295699 A1 | 11/2012 | Reiche |
| 2012/0296716 A1 | 11/2012 | Barbeau |
| 2012/0302329 A1 | 11/2012 | Katz et al. ............... 463/25 |
| 2012/0309504 A1 | 12/2012 | Isozaki |
| 2012/0311504 A1 | 12/2012 | Van Os et al. ............... 715/853 |
| 2012/0322545 A1 | 12/2012 | Arnone et al. ............... 463/25 |
| 2012/0322561 A1 | 12/2012 | Kohlhoff ............... 463/42 |
| 2012/0330785 A1 | 12/2012 | Hamick et al. ............... 705/26.41 |
| 2013/0005437 A1 | 1/2013 | Bethke |
| 2013/0005466 A1 | 1/2013 | Mahajan |
| 2013/0005473 A1 | 1/2013 | Bethke |
| 2013/0005475 A1 | 1/2013 | Mahajan |
| 2013/0005480 A1 | 1/2013 | Bethke |
| 2013/0006735 A1 | 1/2013 | Koenigsberg et al. ............... 705/14.12 |
| 2013/0006736 A1 | 1/2013 | Bethke |
| 2013/0012304 A1 | 1/2013 | Cartwright |
| 2013/0013094 A1 | 1/2013 | Parks et al. ............... 700/92 |
| 2013/0013326 A1 | 1/2013 | Miller et al. ............... 705/1.1 |
| 2013/0013459 A1 | 1/2013 | Kerr |
| 2013/0029745 A1 | 1/2013 | Kelly et al. ............... 463/19 |
| 2013/0072278 A1 | 3/2013 | Salazar et al. ............... 463/16 |
| 2013/0079087 A1 | 3/2013 | Brosnan et al. ............... 463/16 |
| 2013/0090173 A1 | 4/2013 | Kislyi |
| 2013/0090750 A1 | 4/2013 | Herrman et al. ............... 700/92 |
| 2013/0095914 A1 | 4/2013 | Allen et al. ............... 463/25 |
| 2013/0123005 A1 | 5/2013 | Allen et al. ............... 463/29 |
| 2013/0124361 A1 | 5/2013 | Bryson |
| 2013/0151342 A1 | 6/2013 | Citron et al. ............... 705/14.64 |
| 2013/0173393 A1 | 7/2013 | Calman et al. ............... 705/14.66 |
| 2013/0178259 A1 | 7/2013 | Strause et al. ............... 463/6 |
| 2013/0210511 A1 | 8/2013 | LaRocca et al. ............... 463/12 |
| 2013/0217489 A1 | 8/2013 | Bendayan |
| 2013/0226733 A1 | 8/2013 | Evans |
| 2013/0237299 A1 | 9/2013 | Bancel et al. ............... 463/9 |
| 2013/0244767 A1 | 9/2013 | Barclay |
| 2013/0288757 A1 | 10/2013 | Guthridge |
| 2013/0290147 A1 | 10/2013 | Chandra et al. ............... 705/27.1 |
| 2013/0303276 A1 | 11/2013 | Weston et al. ............... 463/29 |
| 2013/0310164 A1 | 11/2013 | Walker et al. ............... 463/26 |
| 2013/0344932 A1 | 12/2013 | Adams et al. ............... 463/17 |
| 2014/0004884 A1 | 1/2014 | Chang |
| 2014/0018156 A1 | 1/2014 | Rizzotti et al. ............... 463/25 |
| 2014/0033262 A1 | 1/2014 | Anders |
| 2014/0038679 A1 | 2/2014 | Snow ............... 463/11 |
| 2014/0067526 A1 | 3/2014 | Raju |
| 2014/0067544 A1 | 3/2014 | Klish |
| 2014/0073436 A1 | 3/2014 | Takagi |
| 2014/0087864 A1 | 3/2014 | Togashi ............... 463/29 |
| 2014/0089048 A1 | 3/2014 | Bruich |
| 2014/0100020 A1 | 4/2014 | Carroll |
| 2014/0128137 A1 | 5/2014 | Balise, III ............... 463/10 |
| 2014/0157314 A1 | 6/2014 | Roberts |
| 2014/0206452 A1 | 7/2014 | Bambino |
| 2014/0243072 A1 | 8/2014 | Santini |
| 2014/0274359 A1 | 9/2014 | Helava |
| 2014/0295958 A1 | 10/2014 | Shono |
| 2014/0329585 A1 | 11/2014 | Santini |
| 2014/0337259 A1 | 11/2014 | Lamb |
| 2015/0011286 A1 | 1/2015 | Kim |
| 2015/0019349 A1 | 1/2015 | Milley |
| 2015/0031440 A1 | 1/2015 | DeSanti et al. ............... 463/25 |

(56) References Cited

U.S. PATENT DOCUMENTS

| | | |
|---|---|---|
| 2015/0306494 A1 | 10/2015 | Pieron |
| 2015/0335995 A1 | 11/2015 | McLellan |
| 2015/0352436 A1 | 12/2015 | Pieron |

FOREIGN PATENT DOCUMENTS

| | | |
|---|---|---|
| WO | WO 2013/013281 | 1/2013 |
| WO | WO 2013/059639 | 4/2013 |
| WO | WO 2013/116904 | 6/2013 |
| WO | 2015013373 | 1/2015 |
| WO | 2015168187 | 11/2015 |
| WO | 2015179450 | 11/2015 |
| WO | 2015196105 | 12/2015 |

OTHER PUBLICATIONS

"Clash of Clans". Wikipedia.org. Online. Accessed via the Internet. Accessed Aug. 9, 2014. <URL: http://en.wikipedia.org/wiki/Clash of Clans>, 3 pages.
"Gem calculation formulas", forum.supercell.net. Online. Accessed via the Internet. Accessed Aug. 9, 2014. <URL: http://forum.supercell.net/showthread.php/23028-Gem-calculation-formulas>, 3 pages.
"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.
"Lotro-Wiki.com" (evidence in regards to "Lord of the Rings Oline" MMORPG game), latest Dec. 22, 2011, http://lotro-wiki.com/index.php/Main_Page) (hereinafter referred to as Lotro>, http://lotro-wiki.com/index.php?title=LOTRO_Store&oldid=396550, http://lotro-wiki.com/index.php?title=Quest:A_Little_Extra_Never_Hurts_—_Part_1&oldid=399597, http://lotro-wiki.com/index.php?title=Quest:A_Little_Extra_Never_Hurts_—.
"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.
City Coins. CityVille Wikia. Online. Accessed via the Internet. Accessed Aug. 9, 2014. <URL: http://cityville.wikia.com/wiki/City_Coins>, 2 pages.
"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-I-do->, Apr. 23, 2014, 9 pages.
"Behavioural Analytics & Campaigning", http://lotaris.com/behavioural._analytics_and._Campaigning.htm, screenshot access date May 24, 2012 2:21 PM, 1 page.
"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.
FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.
Gaia "Black Friday Bundle" available on Nov. 23, 2011, from http://www.gaiaonline.com/forum/community-announcements/black-friday-big-bundles-rare-items/t.76127933/, 5 pages.
Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1—14-29-Hamari,Lehdonvirta.pdf, on May 26, 2015, 16 pages.

MMO Site "Rose Online Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.
TFWiki "teamfortress wiki" available Nov. 5, 2011 retrieved from https://web.archive.org/web/20111105044256/http://wiki.teamfortress.com/wiki/Loadout, 4 pages.
UBC, "Theory of Auctions" available on Mar. 24, 2012 from https://web.archive.org/web/20120324204610/http:/montoya.econ.ubc.ca/Econ522/auctions.pdf, slide 5, Para. 1.3, 19 pages.
Wiki "Gaia online", available on Sep. 9, 2011, https://web.archive.org/web/20110927210155/http://en.wikipedia.org/wiki/Gaia_Online, 8 pages.
"Digital River World Payments and Lotaris Partner to Extend Mobile Application Licensing and Monetization Capabilities to Software Publishers", LOTARIS Press Release, http://www.lotaris.com/digital_river_world_payments_and_lotaris_partne . . . , posted Tuesday, Mar. 27, 2012, screenshop access date May 24, 2012, 2:19 PM, 1 page.
Ozeagle, "What happens if . . . answers about account types" on Lotro forum, Jan. 18, 2011,<https://www.lotro.com/forums/showthread.php?377885-What-happens-if-answers-about-the-account-types> (16 pgs).
<http://lotro-wiki.com/index.php?title=Ouest:A_Little_Extra_Never_Hurts_—_Part_2&oldid=399366>, <http://lotrowiki.com/index.php ?title=Getting_Started&oldid=349681 >. Links are to used articles. (7 pgs) Feb. 26, 2014.
"Lotro-Wiki.com" (evidence in regards to "Lord of the Rings Oline" MMORPG game),latest Dec. 22, 2011,<http://lotrowiki.com/index.php/Main_Page)(hereinafter referred to as Lotro>,<http://lotrowiki.com/index.php?title=LOTRO_Store&oldid=396550>,<http://lotrowiki.com/index.php?title=Ouest:A_Little_Extra_Never_Hurts_—_Part_1 &oldid=399597> (28 pgs).
Katkoff, Michail, "Clash of Clans—the Winning Formula", Sep. 16, 2012, retrieved from Internet on Sep. 30, 2015 from URL <http://www.deconstructoroffun.com/2012/09/clash-of-clans-winning-formula.html>, 13 pages.
Elsword—Wikipedia, the free encyclopedia, URL: en.wikipedia.org/wiki/Elsword [Retrieved Feb. 21, 2013], 6 pages.
Path of Exile—Forum—Beta General Discussion—Unique Items Compendium 60/71 URL: web.archive.org/web/20120608004658/http://www.pathofexile.com/forum/view-thread/12056 [Retrieved Jun. 24, 2013], 52 pages.
"Treasure Chest Game" written by Zelda Wiki, the Zelda encyclopedia; published on or before Oct. 17, 2012; accessible andprinted from URL <http://web.archive.org/web/20121017085058/http://zeldawiki.org/Treasure_Chest_Game>, 4 pages.
New Feature: Tiered Tournaments and Tournament Updates, printed from http://community.kabam.com/forums/showthread.php?171349-New-Feat on Feb. 11, 2014, 2 pages.
Wikipedia, Mafia Wars, <http://en.wikipedia.org/wiki/Mafia_Wars>, Jan. 28, 2012, 3 pages.
"Cataclysm Guide: Guild Advancement—Wowhead", http://www.wowhead.com/guide=cataclysm&guilds, printed Dec. 5, 2013, 4 pages.
TFF Challenge—UC Davis, http://tffchallenge.com/team/uc-davis/, printed Jan. 15, 2014, 12 pages.
"Guild Housing System—FlyFF Wiki", http://flyff-wiki.gpotato.com/wiki/Guild_Housing_System, printed Dec. 5, 2013, 5 pages.
Gem System—Street Fighter X Tekken, http://www.streetfighter.com/us/sfxtk/features/gem-system, printed Nov. 6, 2012, 6 pages.
Profession—WoWWiki—Your guide to the World of Warcraft, http://www.wowwiki.com/Profession, printed Nov. 6, 2012, 8 pages.
Elsword, Dec. 27, 2007, KOG Studios, Guide posted Mar. 17, 2011, http://forums.elswordonline.com/topic5673.aspx, http://en.wikipedia.org/wiki/Elsword, 16 pages.
Diablo 2, Blizzard Entertainment, Mar. 23, 2009, manual and online website, http://web.archive.org/web/20090323171356/http://classic.battle.net/diablo 2exp/items/basics.shtml, 51 pages.

(56) References Cited

OTHER PUBLICATIONS

Path of Exile, Internet posting: http://web.archive.org/web/20120606004658/http://www.pathofexile.com/forum/view-thread/12056, Nov. 16, 2011, 52 pages.
MapleStory, Internet guide: http://maplestory.nexon.net/guides/game-play/systems/00Flk/,http://maplestory.nexon.net/guides/game-play/systems/00Flk,http://maplestory.nexon.net/guides/game-play/systems/00FFV, Sep. 28, 2012, 12 pages.
MapleStory—Guides—Equipment Upgrading 101: Scrolls, URL: maplestory.nexon.net/guides/game-play/systems/OOFFV/#mitigating [Retrieved Jun. 24, 2013], 4 pages.
MapleStory—Guides—Equipment Upgrading 101: Enhancements, URL: maplestory.nexon.net/guides/game-play/systems/OOFlk [Retrieved Jun. 24, 2013], 3 pages.
MapleStory—Guides—Equipment Upgrading 101: Potentials, URL: maplestory.nexon.net/guides/game-play/systems/OOFlj [Retrieved Jun. 24, 2013], 5 pages.
Dreamslayer's Enchanting and Upgrading Guide—With Pictures:D and Explanations, URL: forums.elswordonline.com/Topic5673.aspx [Retrieved Feb. 21, 2013], 10 pages.
The Arreat Summit—Items: Basic Item Information, URL: web.archive.org/web/20090323171356/http://classic.battle.net/diablo2exp/items/basics.shtml [Retrieved Feb. 21, 2013], 3 pages.
MapleStory—Guides—Equipment Upgrading 101: Potentials, URL: maplestory.nexon.net/guides/game-play/systems/OOFlj/ [Retrieved Jun. 24, 2013], 5 pages.
Super Marie Bros. 3 Review, Nintendo for NES, Feb. 1990, pp. 1-4.
Super Mario Bros. 3, NES Gameplay, http://www.youtube.com/watch?v=82TL-Acm4ts, 1 page.
Super Mario Bros. 3, StrategyWiki, the video game walkthrough and strategy guide, http://strategywiki.org/wiki/Super_Mario_Bros._3, 4 pages.
"Kabam Community Forums>Kingdoms of Camelot>Kingdoms of Camelot Open Discussion>Open Discussion : Tournament of Might Prizes / Main Discussion thread", printed from http://community.kabam.com/forums/archive/index.php/t-43273.html, Oct. 24, 2011, 23 pages.
"Rest—WoWWiki—Your guide to the World of Warcraft", printed from http://www.wowwiki.com/Rest, May 19, 2014, 2 pages.
"Quest item—WoWWiki—Your guide to the World of Warcraft", printed from http://www.wowwiki.com/Quest Item, Apr. 16, 2014, 1 page.

\* cited by examiner

SYSTEM AND METHOD FOR PROVIDING A QUEST FROM A PROBABILITY ITEM BUNDLE IN AN ONLINE GAME

FIELD OF THE DISCLOSURE

This disclosure relates to a system and method for providing a quest from a probability item bundle in an online game.

BACKGROUND

Online games providing quests are known; however, conventional systems do not provide a quest from a probability item bundle in an online game.

SUMMARY

One aspect of the disclosure relates to a system configured to provide a quest from a probability item bundle in an online game. In some implementations, the system may perform a method including executing an instance of an online game, and maintaining inventories of virtual items under the control of the users, and storing associations between the users and virtual items under their control. In some implementations, the system may perform a method including effectuating presentation to users, through a shop interface, offers to sell probability item bundles, individual ones of the probability item bundles being associated with sets of potential awards for the online game. The probability item bundles may include a first probability item bundle being associated with a first set of potential awards. The first set of potential awards may include a first potential award and a second potential award. The first potential award may include access to a first quest in the online game. In some implementations, the system may perform a method including associating potential awards in the sets of potential awards with different award distribution probabilities such that the first potential award is associated with a first award distribution probability and the second potential award is associated with a second award distribution probability. In some implementations, the system may perform a method including purchasing of probability item bundles by users, which may result in adding the purchased probability item bundles to the inventories of the users such that responsive to purchasing of the first purchased probability item bundle by a first user, adding the first purchased probability item bundle to a first inventory of virtual items under the control of the first user. In some implementations, the system may perform a method including receiving activation requests from users for purchased probability item bundles under user controlled inventories, and stochastically distributing potential awards to the users in accordance with the award distribution probabilities associated with the potential awards such that, in response to receiving an activation request from the first user for the first probability item bundle subsequent to purchase of the first probability item bundle by the first user, stochastically selecting one of the potential awards from the first set of potential awards in accordance with the award distribution probabilities associated with the potential awards, and distributing the stochastically selected first potential award to the first user, wherein responsive to the selection and distribution of the first potential award to the first user, providing the first user with access to the first quest in the online game.

In some implementations, providing a quest from a probability item bundle in an online game may be performed by processors executing computer program components. In some implementations, the system may include one or more servers. The server(s) may be configured to communicate with one or more client computing platforms according to a client/server architecture. The users may access the system via the client computing platforms, for instance, to engage in one or more games.

The server(s) may be configured to execute one or more computer program components to provide one or more games to users (or players). The computer program components may include one or more of a game component, a user profile management component, a user inventory component, a shop component, a probability item bundle management component, and/or other components. It is noted that the client computing platforms may include one or more computer program components that are the same as or similar to the computer program components of the server(s) to facilitate individualized content made available to the users of online games.

The game component may be configured to execute an instance of an online game, and to implement the instance of the online game to facilitate participation of the user in gameplay of the online game, via client computing platforms.

The user inventory component may be configured to maintain inventories of virtual items under the control of the users, and to store associations between the users and virtual items under their control.

The shop component may be configured to effectuate presentation to users, through a shop interface, offers to sell probability item bundles, individual ones of the probability item bundles being associated with sets of potential awards for the online game. The probability item bundles may include a first probability item bundle associated with a first set of potential awards, the first set of potential awards including a first potential award, the first potential award including access to a first quest in the online game.

The probability item bundle management component may be configured to receive activation requests from users for purchased probability item bundles under user controlled inventories, and to stochastically distribute potential awards to the users in accordance with the award distribution probabilities associated with the potential awards such that, in response to receiving an activation request from the first user for the first probability item bundle subsequent to purchase of the first probability item bundle by the first user. In some implementations, the probability item bundle management component may be configured to stochastically select one of the potential awards from the first set of potential awards in accordance with the award distribution probabilities associated with the potential awards, and to distribute the stochastically selected first potential award to the first user, and wherein responsive to the selection and distribution of the first potential award to the first user, the first user is provided with access to the first quest in the online game.

One aspect of the disclosure relates to a computer-implemented method for providing a quest from a probability item bundle in an online game. In an implementation, the method may be implemented in a computer system that includes one or more physical processors and storage media storing machine-readable instructions. In some implementations, the method may include executing an instance of an online game and implementing the instance of the online game to facilitate participation in the online game by users via client computing platforms, and maintaining inventories of virtual items under the control of the users, and storing associations between the users and virtual items under their control. In some implementations, the method further may include effectuating presentation to users, through a shop interface, offers to sell probability item bundles, individual ones of the probability item bundles being associated with sets of potential awards for the online game, the probability item bundles including a first probability item bundle being associated with a first set of potential awards. The first set of potential awards may include a first potential award and a second potential award. The first potential award may include access to a first quest in the online game. The method further may include associating potential awards in the sets of potential awards with different award distribution probabilities such that the first potential award is associated with a first award distribution probability and the second potential award is associated with a second award distribution probability. The method further may include receiving activation requests from users for purchased probability item bundles under user controlled inventories, and stochastically distributing potential awards to the users in accordance with the award distribution probabilities associated with the potential awards such that, in response to receiving an activation request from the first user for the first probability item bundle subsequent to purchase of the first probability item bundle by the first user, stochastically selecting one of the potential awards from the first set of potential awards in accordance with the award distribution probabilities associated with the potential awards, and distributing the stochastically selected first potential award to the first user, wherein responsive to the selection and distribution of the first potential award to the first user, providing the first user with access to the first quest in the online game.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
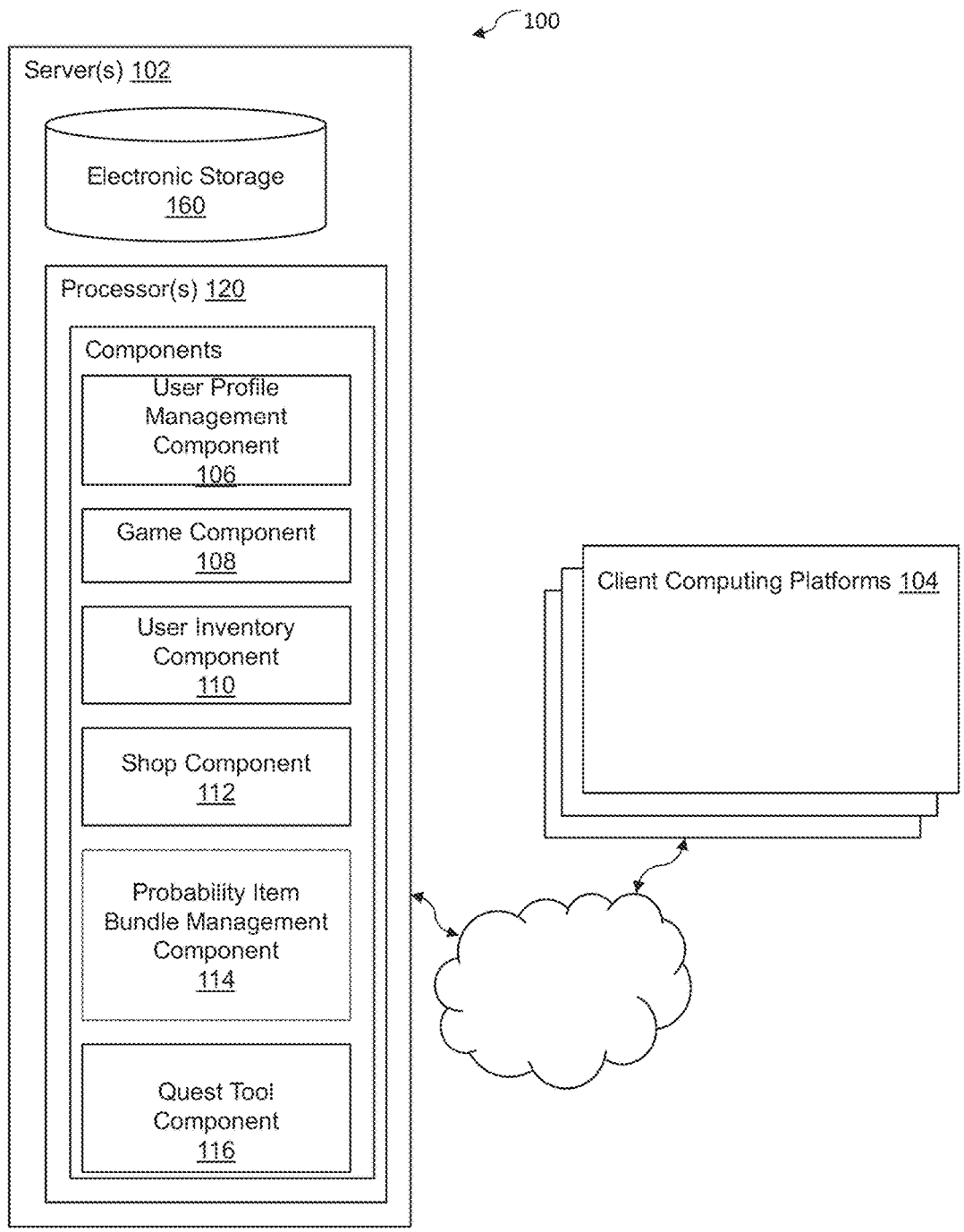
FIG. 1 illustrates a system configured to provide a virtual space for an online game, in accordance with some implementations.

FIG. 1 illustrates a system 100, which may be configured to provide a virtual space to users. Providing the virtual space may include hosting the virtual space over a network. In some implementations, system 100 may include one or more servers 102. Server 102 may be configured to communicate with one or more client computing platforms 104, which may be in accordance with a client/server architecture. Users may access system 100 and/or the virtual space via client computing platforms 104.

Server 102 may be configured to execute one or more computer program components. The computer program components may include one or more of a user profile management component 106, a game component 108, a user inventory component 110, a shop component 112, a probability item bundle management component 114, a quest tool component 116, and/or other components. The client computing platform(s) 104 may include one or more computer program components that are the same as or similar to the computer program components of the example server(s) 102 to provide a virtual space to users and to facilitate in-game actions.

In some implementations, a developer using a quest tool interface of a quest tool component 116 may create additional game content to include a new quest in the online game. In some implementations, a new quest may provide an introduction to new online game content. A new quest may provide new gameplay to one or more of low-level, mid-level, and/or high-level payers. A new quest may be introduced into an online game via a probability item bundle. A new quest may be similar to or different from existing game quests, which may be referred to as "universal" game quests.

As used herein, both a new game quest and a universal game quest are both a type of general quest, which may include a storyline within the game that includes content (e.g., a character, a place, a building, a boss, an enemy, a vehicle, and/or other content) and one or more tasks to be performed by a user within and/or using the content for the quest. Completion of the quest may be characterized by performance and/or completion of one or more tasks. Upon completion of a quest, rewards may be distributed to the user. The rewards may include static rewards (e.g., the same for all players/completions) and/or dynamic reward (e.g., different for different players completions). For example, a static reward may be the same for two different players that complete a given quest. A dynamic reward may be different for the two different users. Some quests may be repeatable for an individual player. An example of a dynamic reward for the given quest may result in a single user getting different rewards on different completions of the given quest. Some quests may present multiple tasks in a linear manner. Some quests may permit players to influence the order in which tasks are completed.

In some implementations, a universal game quest may refer to a quest that is available to players in the game without accessing a probability item bundle. This may include quests that become available based on gameplay associated with existing content of the online game. For example, a universal game quest may become available to players that achieve a certain level, perform some previous quest or set of quests, obtain (e.g., through gameplay) a gating item that provides access to a quest, and/or through other aspects of gameplay, which is associated with existing content. In some implementations, a universal game quest may include a quest that follows an established or existing game progression of the online game.

In some implementations, a live operations team may be the same or different from a game developer team of the online game. A live operations team may create a new quest with quest tool component 116. A new quest may directly impact existing game content and game evolution of the online game. In some implementations, a number of possible new quests will not be restricted by the existing quests or quest capabilities developed by the game development team of the online game, but may be created, as necessary and after initial execution of the online game, by a live operations team interfacing with a quest tool component 116.

In some implementations, a new quest may be programmed to include associated quest parameters. In some implementations, quest parameters may include a particular number or quantity of a particular type of new quest. In some implementations, the quantity of a particular type of new quest may be associated with a probability distribution function. In some implementations, each new quest type may be associated with one or more quest parameters, such as a quest name, a quest prize, a quest bonus, one or more quest tasks, or quest condition/s for success. In some implementations, a new quest may be introduced to user by presentation of a probability item bundle. In some implementations, if the new quest is deemed acceptable for further integration into the online game, some time after the introduction of the new quest, the new quest may be made into a universal quest or part of a universal quest of the online game. Further integration of a new quest in an online game may allow for the new quest to be made available to more users than for which it was initially designed.

User profile management component 106 may be configured to manage user profiles. In some implementations, a user may have a profile associated with user information including user parameters associated with gameplay and game content. In some implementations, a user parameter may include a game entity, which may be a type of game object that is controlled by the user. In some implementation a game entity may be associated with a game level. In some implementations, a type of game entity, which may be controlled by a user, is described as a game character. The game character may be controlled to perform one or more activities of available gameplay activities. In some implementations, gameplay activity may include a quest including one or more tasks. In some implementations, game objects may refer to all game design elements, which may include simulated physical phenomena (e.g., wind, rain, earthquakes, and/or other phenomena), and/or other game objects used to create game content in the virtual space of the online game. In some implementations, game objects and game entities, which interact with other game entities and/or objects within the virtual space. In some implementations, game objects include bases, forts, tanks, transport devices, cities, armies, soldiers, a wizard, an elf, or anything listed herein or externally that may be part of an online game. In some implementations, a game character is a type of game object, which is a controlled by a user to perform gameplay activity, such as a quest including one or more tasks.

User profile management component 106 may be configured to record user profiles and/or user parameters associated with users of the system 100. The one or more user profiles and/or user information may include information stored by server 102, one or more of the client computing platforms 104, and/or other storage location. In some implementations, the user profile management component 106 may keep track of game objects, such as game content, user actions, game characters, user gameplay, gampleplay activity, quests, accomplished tasks, etc. associated with a particular user.

Game component 108 may be configured to execute an instance of an online game, and to implement the instance of the online game to facilitate participation of users in the online game via a client computing platform 104. In some implementations, participation in the online game includes implementing the instance of the online game to facilitate participation of the user in gameplay of the online game, via client computing platforms. In some implementations, executed game actions affect gameplay as executed game actions include user controlled gameplay activity, such as a quest and its associated one or more tasks. In some implementations, participation in the online game includes executing gameplay activity of user controlled game entities, such as characters, which may affect gameplay and content of the online game in the instance of the online.

Game component 108 may be configured to implement an instance of the online game to show how it affects the virtual space executed by the computer components and to effectuate presentation of views of the virtual space to a user. The instance of the virtual space may reflect the state of the virtual space. The instance of the virtual space may be used to push state information to clients (e.g., client computing platforms 104) for implementation on the client, may be used to verify state information generated on client executing expressions of the instance locally, and/or for other purposes. State information may include information about the state of the virtual space such as, without limitation, position information of one or more game objects, topography information, object status/shape information, content information, score information, user or game entity progress information, user inventory information, user or character resource information, progress information for one or more gameplay activities or game actions, view information describing a view of the virtual space, and/or other information that describes the state of the virtual space. Expressions of the instance executed on the client facilitate presentation of views on the client of the virtual space. Expressions of the instance executed on the client may be configured to simply present views of the virtual space based on the state information (e.g., via streaming view information, object/position information, and/or other state information) received from game component 108. Expressions of the instance executed on the client may include space logic that effectively provides for execution of a limited version of the instance on a client that is synchronized and/or verified with state information received from from game component 108. The view presented on a given client may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients that present the views of the virtual space to a user. The simulated space may have a topography, express ongoing real-time interaction by one or more users, and/or include one or more game objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

In some implementations, the instance of the virtual space may include one or more user selectable game actions. A user may select an action as part of online gameplay. In some implementations, the selected action may be a task, which is part of a quest or other gameplay activity within the online game. Example gameplay activity includes game actions including fighting, developing a skill, building, crafting, modifying, upgrading, trading, selling, and/or repairing an item, an equipment, a building, and/or a structure; training, building, modifying, healing, requesting, upgrading, selling, and/or repairing an in-game unit; harvesting, refining, trading, selling, developing, spending, and/or consuming an in-game resource; using, performing, developing, modifying, upgrading, and/or training a skill, ability, and/or attribute; completing in-game travel, reloading a weapon, receiving assistance such as a hint and/or a clue, researching a technology a user wants to develop or to unlock in a game or dedicating resources and/or researchers to researching that technology, which may in turn lead to more technology development, and/or other actions. In some implementations, an existing quest task and a new quest task may include same or similar gameplay activity. In some implementations, a new quest task may include gameplay activity different from existing gameplay activity.

In some implementations, within the instance of the virtual space executed by game component 108, users may control game objects, such as characters, simulated physical phenomena (e.g., wind, rain, earthquakes, and/or other phenomena), and/or other entities within the virtual space to interact with the virtual space and/or other users characters. The user characters may include avatars. As used herein, the term "user character" may refer to a game object (or group of objects) present in the virtual space that is controlled by and that represents an individual user. The user controlled entity may move through and interact with the virtual space (e.g., non-user controlled characters in the virtual space, other objects in the virtual space). The user controlled entity may be controlled by and/or associated with a given user may be created and/or customized by the given user. The user may have an "inventory" of virtual goods and/or currency that the user can use (e.g., by manipulation of a user character or other user controlled entity, and/or other items) within the virtual space.

The above description of the views of the virtual space determined from the instance executed by game component 108 is not intended to be limiting. The virtual space may be presented in a more limited, or richer, manner. For example, views of the virtual space may be selected from a limited set of graphics depicting an event in a given place within the virtual space. The views may include additional content (e.g., text, contextual pop-up windows, audio, pre-stored video content, and/or other content) that describes particulars of the current state of the place, beyond the limited set of graphics. For example, a view may include a generic battle graphic with a textual description of the opponents to be confronted. Other representations of individual places within the virtual space are contemplated.

In some implementations, users may participate in the instance of the virtual space by controlling one or more of the available user controlled game entities in the virtual space. Control may be exercised through control inputs and/or commands input by the users through client computing platforms 104. The users may interact with each other through communications exchanged within the virtual space. Such communications may include one or more of communications over an affiliation portal, textual chat, instant messages, email messages, private messages, voice communications, and/or other communications. Communications may be received and entered by the users via their respective client computing platforms 104. Communications may be routed to and from the appropriate users through server 102 (e.g., through game component 108).

User inventory component 110 may be configured to maintain inventories of virtual items under the control of the users, and to store associations between the users and virtual items under their control. User inventory component 110 may be configured to maintain information about virtual items added to an inventory of a user that is controlled by the selected user in the virtual space. Virtual items include virtual goods and/or currency that the user can use in a virtual space. Virtual items include items, such as currency, awards, bonuses, power ups, and quests, etc. In some implementations, virtual items may include a probability item. In some embodiments, virtual items may include a new quest, which was introduced from a probability item bundle. In some embodiments, a user may acquire a probability item bundle and decide to store it in inventory for later use. In some embodiments, a user may acquire a new quest offered via a probability item bundle, and may determine to store the new quest for later use. A user inventory component 110 may be configured to store a new item and enable later access of the particular item, such as a probability item bundle or a new quest. In some implementations, purchasing of a probability item bundle (e.g., FIG. 2, 270) by a user may result in presentation of such information to a user in the virtual space. In some implementations, purchasing of a probability item bundle (e.g., FIG. 2, 270) by a user may result in adding an icon (e.g., FIG. 2, 290) of the purchased probability item bundle to the inventory (e.g., FIG. 2, 250) of the virtual items under control of the user. Probability item bundles or their associated individual awards may be stored in the user inventory component 110.

Shop component 112 may be configured to effectuate presentation of game objects available to users, through a shop interface. In some implementations, game objects available for user purchase include offers to sell probability item bundles. In some implementations, an offer to sell a probability item bundle may be presented in the game content via a mystery box icon or another presentation. In some implementations, individual ones of the probability item bundles may be associated with sets of potential awards for the online game. The probability item bundles may include a first probability item bundle, which may be associated with a first set of potential awards. The first set of potential awards may include a first potential award. The first potential award may include access to a first quest, which may be a new quest, in the online game. Potential awards in the sets of potential awards may be associated with different award distribution probabilities. For example, a first potential award may be associated with a first award distribution probability. A second potential award may be associated with a second award distribution probability. Purchase of probability item bundles by users may result in addition of purchased probability item bundles to the inventories of the users. In some implementations, responsive to purchase of the first purchased probability item bundle by a first user, the first purchased probability item bundle may be added to a first inventory of virtual items under the control of the first user.

Probability item bundle management component 114 may be configured to receive activation requests from users for purchased probability item bundles under user controlled inventories. Probability item bundle management component 114 may be configured to stochastically distribute potential awards to the users in accordance with the award distribution probabilities associated with the potential awards. In some implementations, in response to receiving an activation request from the first user for the first probability item bundle subsequent to purchase of the first probability item bundle by the first user, the probability item bundle management component may be configured to stochastically select one or more of the potential awards from the first set of potential awards in accordance with the award distribution probabilities associated with the potential awards. Probability item bundle management component 114 may distribute the stochastically selected first potential award to a first user, and responsive to the selection and distribution of the first potential award to the first user, the first user may be provided with access to a new quest in the online game.

Quest tool component 116 may be configured to generate a new quest for the online game. As described above, in some implementations, quest tool component 116 may include an interface, which may provide tools to developer teams or live operations teams to design new quests that are different from existing online game quests, which are referred to as universal quests.

In some implementations, the server 102 and client computing platforms 104 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102 and client computing platforms 104 may be operatively linked via some other communication media.

A given client computing platform 104 may include one or more processors configured to execute computer program components. The computer program components may be configured to enable an expert or user associated with the given client computing platform 104 to interface with server 102, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

Server 102 may include electronic storage 160, one or more processors 180, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 160 may comprise non-transitory storage media that electronically stores information. The electronic storage media of electronic storage 160 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 160 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 160 may include one or more virtual storage resources (e.g., cloud storage, a virtual private network, and/or other virtual storage resources). Electronic storage 160 may store software algorithms, information determined by processor 180, information received from server 12, information received from client computing platforms 104, and/or other information that enables server 102 to function as described herein.

Processor(s) 120 is configured to provide information processing capabilities in server 102. As such, processor 180 may include one or more of a digital processor, an analog processor, a digital circuit designed to process information, an analog circuit designed to process information, a state machine, and/or other mechanisms for electronically processing information. Although processor 180 is shown in FIG. 1 as a single entity, this is for illustrative purposes only. In some implementations, processor 180 may include a plurality of processing units. These processing units may be physically located within the same device, or processor 180 may represent processing functionality of a plurality of devices operating in coordination. The processor 180 may be configured to execute components 106, 108, 110, 112, 114, and 116. Processor 180 may be configured to execute components 106, 108, 110, 112, 114, and 116 by software; hardware; firmware; some combination of software, hardware, and/or firmware; and/or other mechanisms for configuring processing capabilities on processor 180. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 106, 108, 110, 112, 114, and 116 are illustrated in FIG. 1 as being implemented within a system 140 implemented by a single processing unit, in implementations in which processor 120 includes multiple processing units, one or more of components 106, 108, 110, 112, 114, and 116 may be implemented remotely from the other components. The description of the functionality provided by the different components 106, 108, 110, 112, 114, and 116 described herein is for illustrative purposes, and is not intended to be limiting, as any of components 106, 108, 110, 112, 114, and 116 may provide more or less functionality than is described. For example, one or more of components 106, 108, 110, 112, 114, and 116 may be eliminated, and some or all of its functionality may be provided by other ones of components 106, 108, 110, 112, 114, and 116. As another example, processor 120 may be configured to execute one or more additional components that may perform some or all of the functionality attributed below to one of components 106, 108, 110, 112, 114, and 116.

Figure 2:
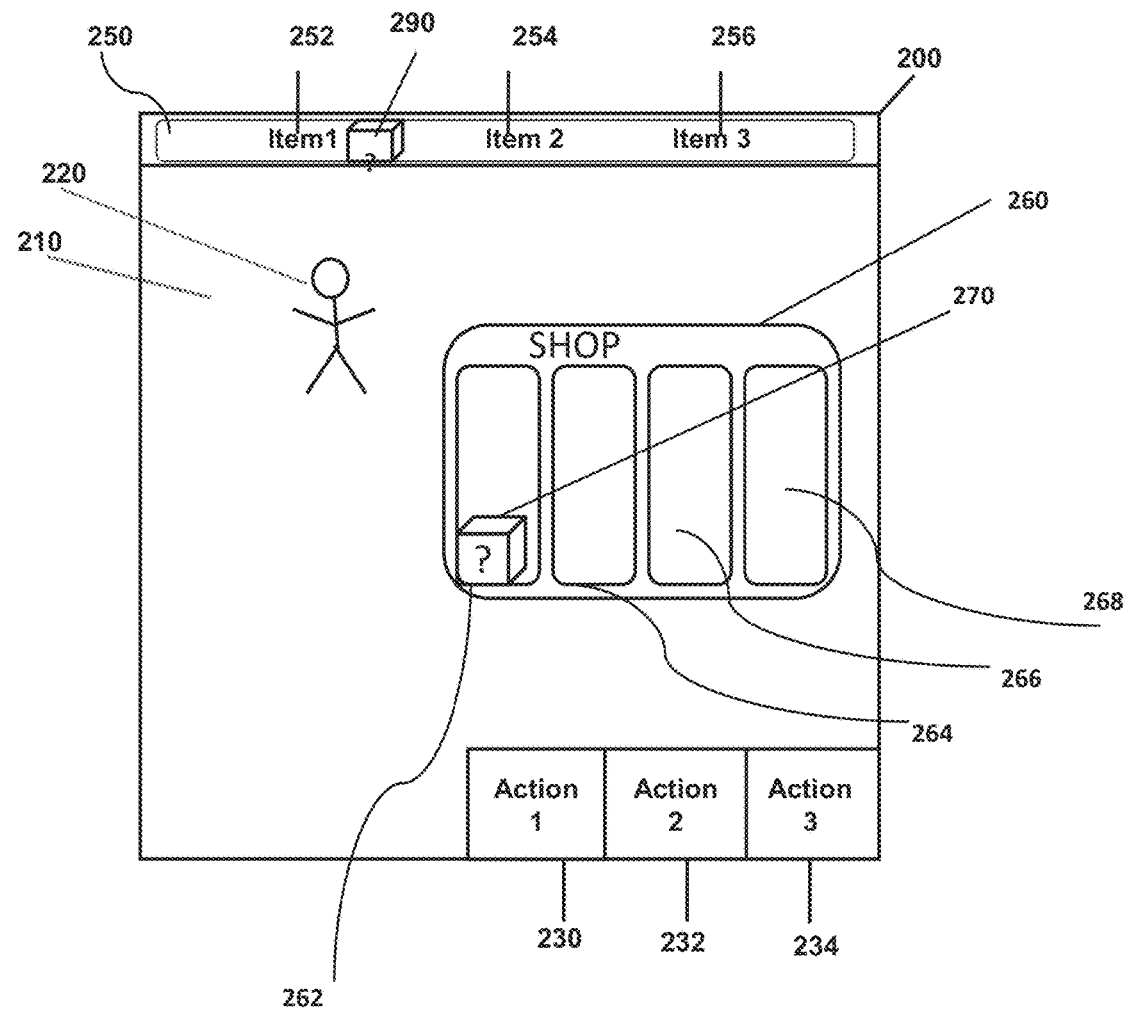
FIG. 2 illustrates a virtual space interface wherein a user is presented with a probability item bundle, in accordance with some implementations.

FIG. 2 illustrates an embodiment of a virtual space interface 200, which may be used to effectuate presentation of game content including gameplay activity to a user, and to facilitate gameplay activity including game actions via computing platform 104. In some implementations, the user controls a game entity 220, such as a user character. The space component 110 may present the user with a number of possible game actions, e.g., 230, 232, 234 at any instance of the game. Game actions include actions that affect game content, such as shop component actions, user character configuration actions, user profile actions, actions that affect gameplay activity, etc, or any other action a user may have available to control game content or configuration. Virtual space interface 200 may be configured to display a virtual space 210 including game content and user controlled entities as described herein. A user may have acquired one or more resources or items 252, 254, 256 for storage in the user's inventory while playing the game. In some implementations, a user may select a first action 230 associated with acquiring more resources. A second action 232 may be associated with an attempt at achieving a particular level of play, and a third action 234 may be associated with attacking another player. Any number or actions may be designed for according to the limits of system 100, or a larger system 100 that may be further distributed across one or more client computing platform(s) 104. Other layouts of virtual space interface 200 are contemplated. In some implementations, game actions may be selected via the virtual space interface 200. In some implementations, other forms of game action selection are contemplated with the disclosure described herein, such as other local or remote input for game action selection. In some implementations, game component 108 may monitor user action during an instance of an online game to determine when the user selects, for example, a first action 230, which may be associated with acquiring more resources.

FIG. 2 illustrates an example implementation wherein a user selects a first action 230, which may be a shop action. In some implementations, after user selection of a shop action (e.g., 230), the game component 108 may present a shop component interface 260. The shop component interface 260 may include categories of options for purchase. In some implementations, a shop interface 260 may include a first category 262, second category 264, third category 266, and a fourth category 268. The categories may be used to group types of available options for purchase. In some implementations, virtual space 210 may present an inventory 250 of current resources or other items, which were purchased or obtained by the user in the online game. In an embodiment, inventory 250 may include a plurality of resources or items, such as a first item 252, a second item 254, a third item 256, etc. which the user may have purchased or obtained in the online game. In some implementations, resources or items available for purchase may be presented without category groupings. In some implementations, a type of item available for purchase includes a probability item bundle 270. A user may select the probability item bundle 270. In some implementations, the online game may present the user with transaction information to complete the transaction of the purchase of the probability item bundle 270. Purchase of a first probability item bundle 270 may include completion of a microtransaction.

In some implementations, after successful completion of purchase of probability item bundle 270, the user may select to store the probability item bundle 270 for later use by, for example, dragging and dropping the probability item bundle to the inventory 250 section of the virtual space 210. The user inventory component 110 may store the purchased probability item bundle 270 to the user inventory component 110. In some implementations, the game component 108 may present a purchased probability item bundle icon 290 in the inventory 250 section of the virtual space 210 for later activation by the user.

As illustrated in FIG. 2, probability item bundle 270 may have a mystery box presentation as its presentation icon, in accordance with some implementations. In some implementations, probability item bundle 270 may be presented with other types of online game presentations, such as a question mark icon, or a rotating star icon, or other presentations, which are included as implementations, but for practical reasons are too numerous to list herein.

Figure 3:
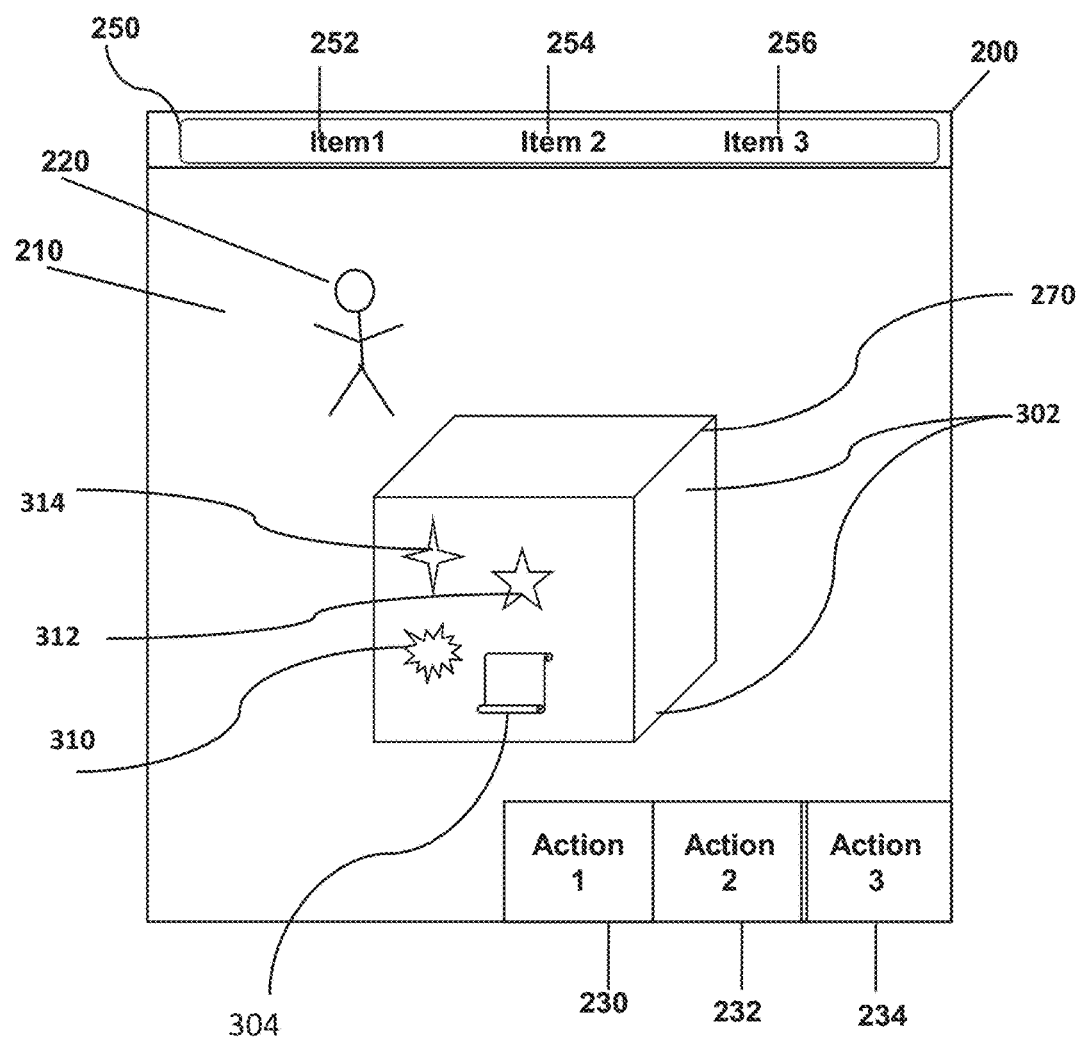
FIG. 3 illustrates a virtual space interface wherein a user is presented with a probability item bundle including a first set of potential awards, in accordance with some implementations.

FIG. 3 illustrates an example implementation of a virtual space 210 wherein a user has selected a probability item bundle 270 and has completed its purchase. In some implementations, the user may have saved the entire probability item bundle 270 in the inventory 250 for later access. The user may access the probability item bundle 270 from the inventory 250. In some implementations, after the user accesses the probability item bundle 270, the user may be presented with a first set of potential awards 302 associated with the probability item bundle 270. In some implementations, potential awards may include one or more of the following: game resources, or items (e.g., 310, 312, 314), or a new game quest 304. Game resources or items may include conventional game resources, such as a character power source 310, an additional game tool or weapon 312, or an in-game purchase resource (e.g., gems, gold, fuel) 314, etc. In some implementations, a user may select to store any purchased or obtained item in an inventory 250 for later use, or may access an item upon its initial presentation. In some implementations, a new quest 304 may be presented as one of the potential awards from a set of potential awards 302 of probability item bundle 270, which may have, as a presentation in the game content, a mystery box presentation. In some implementations, a user may store any item or award from the set of awards 302 by selecting by, for example, dragging and dropping each item to the inventory 250 section of the virtual space 210, or by using other selection input.

Figure 4:
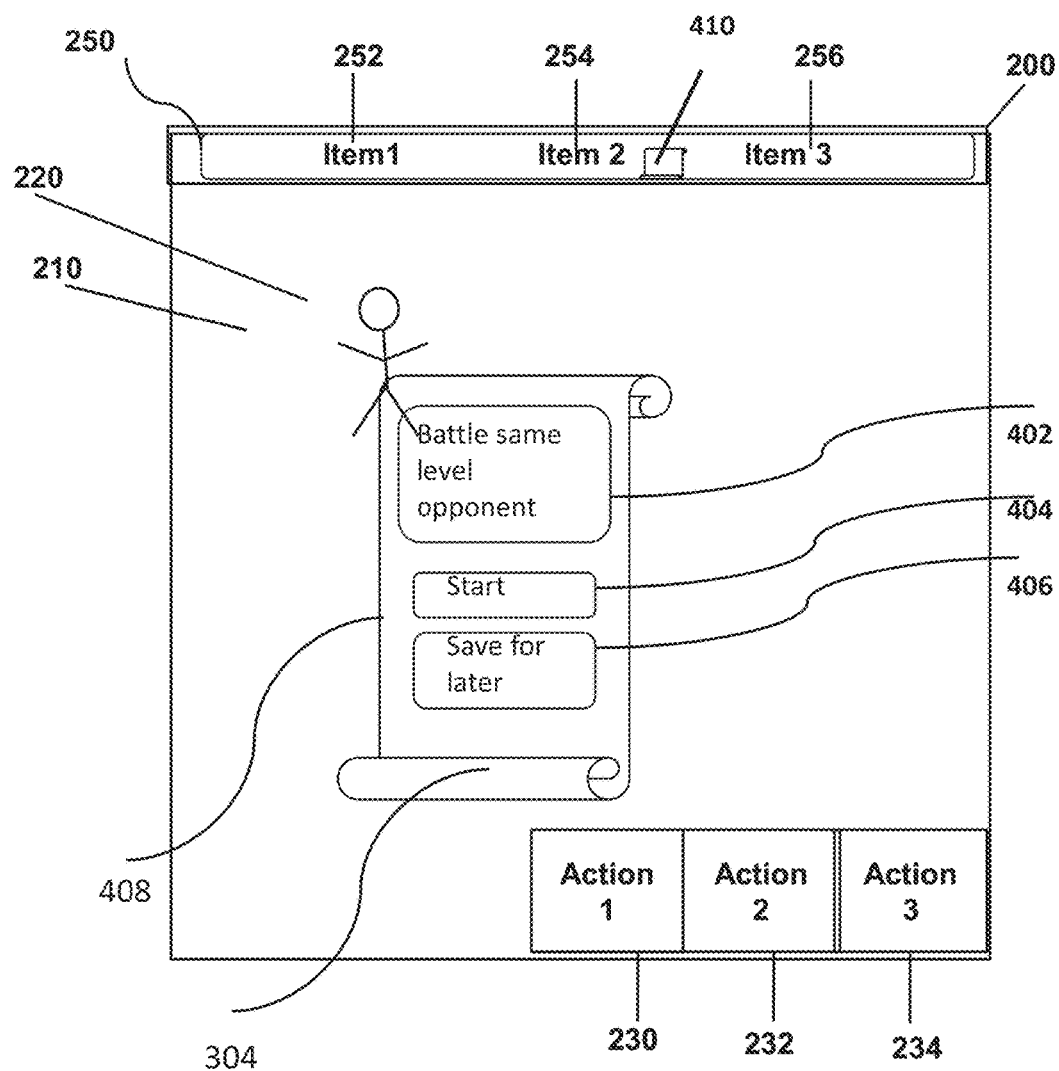
FIG. 4 illustrates a virtual space interface wherein a user is presented with a first quest of a probability item bundle in the online game, in accordance with some implementations.

FIG. 4 illustrates an example implementation of a virtual space 210 wherein a user has selected an individual award from the set of potential awards 302 from a probability item bundle 270 in the online game. In some implementations, the user is presented with the individual award, which may be a new quest 304 having a detailed presentation 408 (e.g. a scroll type icon presentation with access to more options. In some implementations, a user may select the new quest 304 by clicking on its icon (FIG. 3), or by unlocking the new quest 304 by opening an area of a map of a virtual space 210, or by facilitating communication from a quest-giver non-player character, or by providing an item that gives access to the new quest 304.

In some implementations, after successfully accessing the new quest 304, the game component 108 may present more options associated with the new quest 304 to the user. In some implementations, game component 108 may present a new quest presentation 408, which may provide a quest information selection 402, a start quest selection 404, and a save quest selection 406. In some implementations, when a user selects a quest information selection 402, a user may be provided with more details about the quest. In some implementations, a user may review the detailed quest information and then decide to save the quest for a later time, or the user may access the quest immediately. In this case, a user may return back from a detailed information presentation (not shown), which was accessed via selection of quest information selection 402, to the new quest 304 presentation 408 and its associated options, which may include saving the quest 406 for later. In some implementations, if the user selects the save quest selection 406, user inventory component 110 and/or game component 108 may present a new quest 304 icon 410 in the inventory 250 section of the virtual interface. In some implementations, when a user selects to start the new quest 304, the user may be presented with the new quest in the online game.

In some implementations, new quest 304 may be associated with a quest type, a quantity of the quest type per online game, and an associated prize or bonus per quest type. In some implementations, as described above, quest tool component 116 may provide tools to online game developers to design new quests 304 that are different from existing game quests, which are referred to as universal quests. In some implementations, quest tool component 116 may include a quest design team interface component including creation tools for creating a new quest 304 and editing tools for editing existing quests or other quests to make new quests. In some implementations, a new quest 304 may include gameplay activity that directly impacts game content and game evolution controlled by the game component.

In some implementations, successful completion of gameplay criteria of the new quest 304 may result in items, prizes, and/or bonuses that cannot be obtained by completion of a universal quest. In some implementations, universal quests may include gameplay activity that is common or universal to most gameplayers as they progress through the game. In some implementations, universal quests may serve as part of an online game tutorial, wherein the tutorial includes walk-through instructions of the gameplay. In some implementations, universal quests may include game actions of quests resulting in the user leveling up a character or kingdom, or quests that tell a story, or quests that introduce new features. In some implementations, new quest 304 may include gameplay activity including attacking specific tiles, or engaging in a personal tournament of might, or building a certain building or troop. In some implementations, a new quest 304 may also include universal quests or features of universal quests, except the differentiation being that access to a new quest is obtained via a probability item bundle 270. In some implementations, a set of potential awards 302 may include access to a new quest 304 in the online game. In some implementations, potential awards in the sets of potential awards 302 may be associated with different award distribution probabilities.

Figure 5:
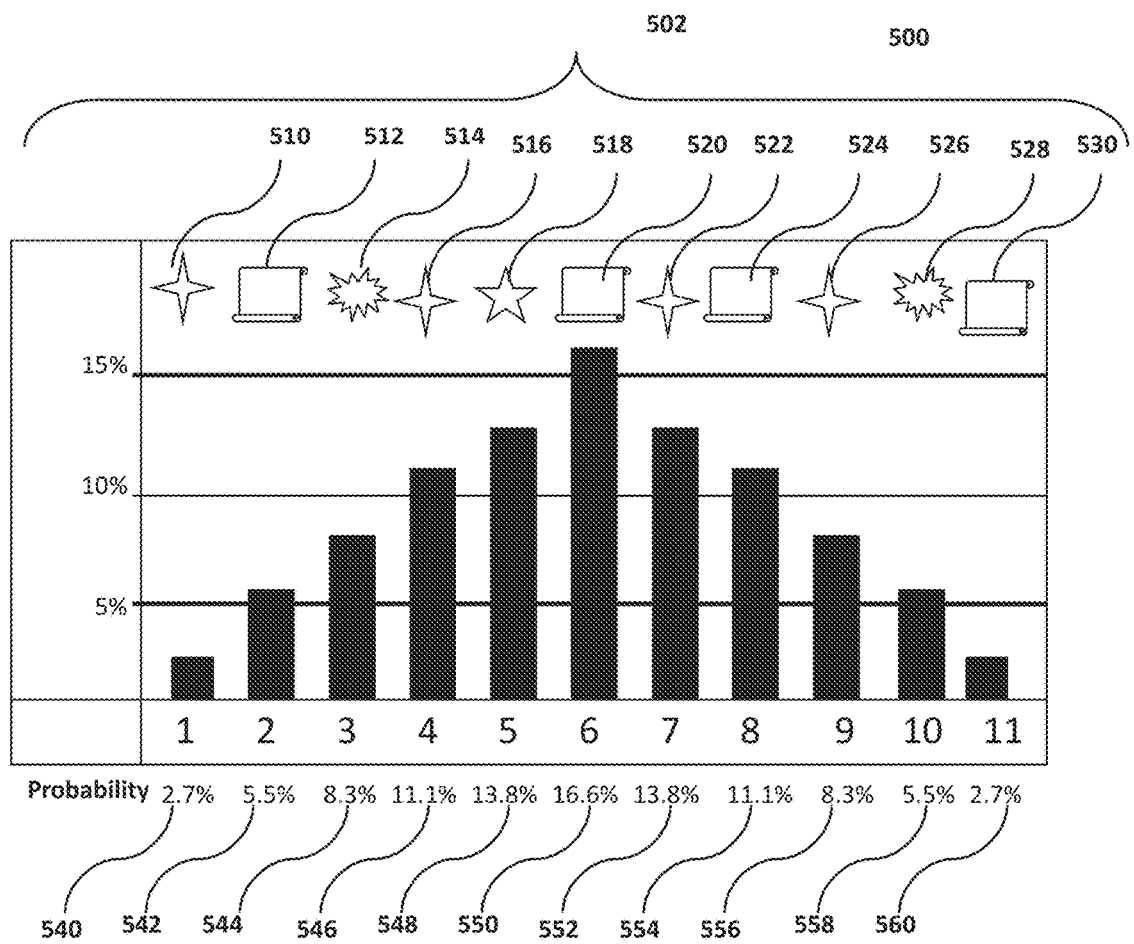
FIG. 5 illustrates award distribution probabilities assigned to corresponding potential awards, in accordance with some implementations.

FIG. 5 illustrates an example implementation of an award distribution probability graph 500 explaining an example of an award distribution probability and its individual awards and their associated individual probabilities. In the implementation of the award distribution probability shown in FIG. 5, different award distribution probabilities may be associated with identifiers 1 to 11 (shown under each graph bar of FIG. 5). Each individual award may have an associated distribution probability indicted below the respective identifier 1-11. In some implementations, each award of a set of potential awards 302 from a probability item bundle 270 may be assigned to a different corresponding potential award distribution probability. FIG. 5 illustrates several example individual awards, 510, 512, 514, 516, 518, 520, 522, 524, 526, 528, and 530 having an associated or a corresponding example individual award distribution probability 540, 542, 544, 546, 548, 550, 552, 554, 556, 558, and 560. In some implementations, a more general type of award may be associated with an individual general award probability, or a particular individual award may have a corresponding individual award probability. In some implementations, an individual award e.g., 520 from a set of potential awards 302 my be a new quest 304, which may have a distribution probability of, for example, 16.6%; and quest award 530 may be a more rewarding type of new quest 304, which may have a distribution probability of 2.7%. For example, 16.6% of the users of the online game will be distributed individual award 520, and 2.7% of the users of the online game will be distributed quest award 530. In some implementations, the probability item bundle management component 114 may assign which award gets distributed to which user based solely on stochastical distribution. In some implementations, an award distribution probability may be used to stochastically distribute potential awards to users of the online game in accordance with the award distribution probability associated with the particular potential award. In some implementations, an award distribution probability may be used to stochastically distribute potential awards to users of the online game in accordance with the award distribution probability associated with the particular potential award and other parameters may also be used in the distribution of the awards. For example, other parameters associated with the user's profile may be also be used combined with the stochastic distribution.

As stated above, in some implementations, a probability item bundle management component 114 may be configured to receive activation requests from users for a purchased probability item bundle 270 under a user controlled inventory 250, and to stochastically distribute a potential award (e.g., quest award 530) to a user in accordance with the associated award distribution probability (e.g., 2.7% 560) from an award distribution probabilities e.g., 502 (e.g., represented by graph 500). In some implementations, the user may provide an activation request for a probability item bundle 270 in many ways, such as clicking in a probability item bundle from a shop interface 260 or by coming upon a probability item bundle 270 in the content of the online game or other introduction techniques intended to be included herein. In some implementations, in response to receiving an activation request (e.g., selection of new quest icon by the user in virtual space 210 of FIG. 2) from the user for a probability item bundle 270, subsequent to purchase of the a probability item bundle 270 by the user, the probability item bundle management component 114 may be configured to stochastically select one of the potential awards (e.g., any one of 510-530) from the first set of potential awards (e.g., 510-530) in accordance with the award distribution probabilities (e.g., 540-560) associated with the potential awards (e.g., guest award 530 is associated with probability 560), and to distribute the stochastically selected potential award (e.g. quest award 530) to the user. In some implementations, responsive to the selection and distribution of the potential award to the user, the user may be provided with access to the new quest 304 in the online game by, for example, the new quest 304 presentation 408. The probability distribution graph 500 presented in FIG. 5 is an example award distribution probability presented for easier understanding. Other probability distributions are included for use herein, but for practical reasons are too numerous to list herein.

Figure 6:
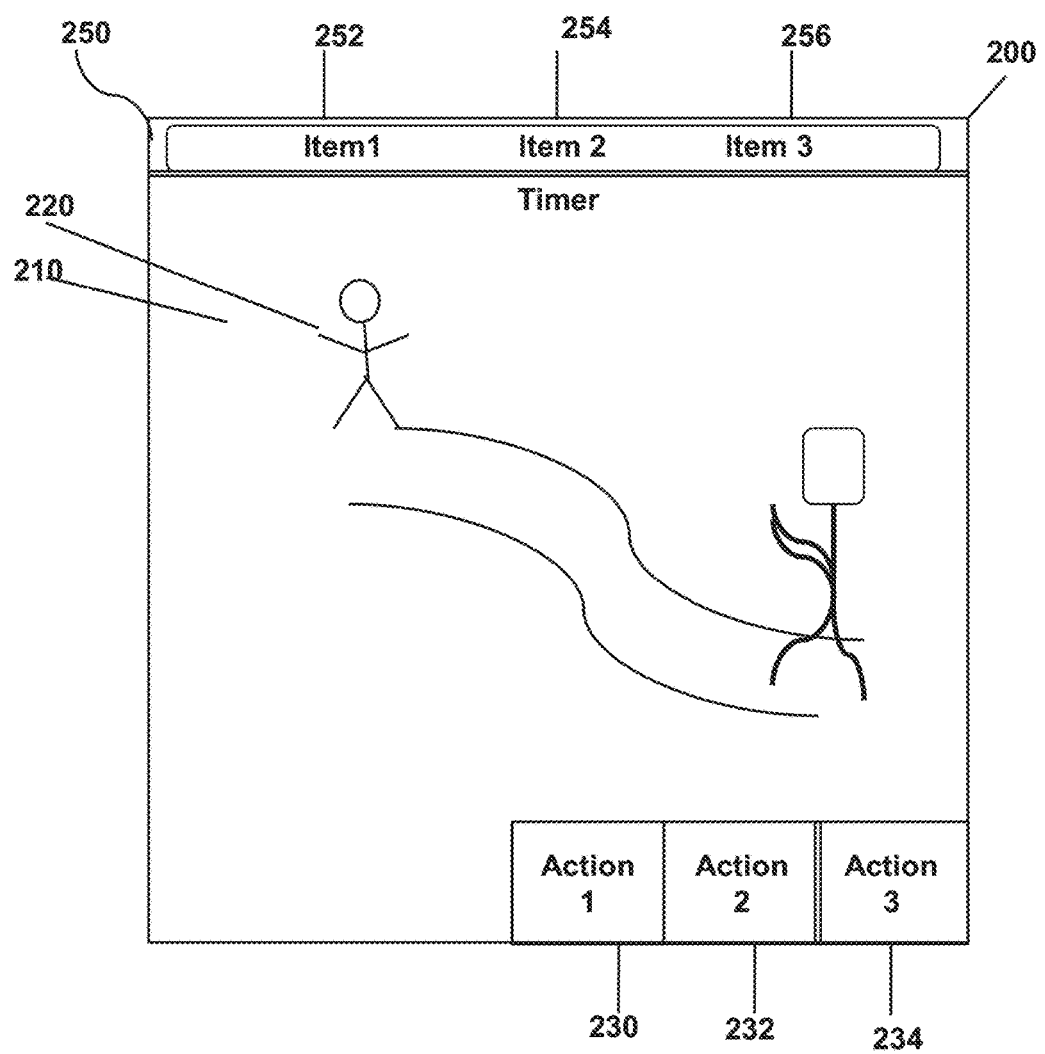
FIG. 6 illustrates a virtual space interface wherein a user is provided with access to a new quest from a probability item bundle in the online game, in accordance with some implementations.

FIG. 6 illustrates an example implementation of a virtual space 210 wherein a user may be provided with access to a new quest from a probability item bundle 270 in the online game, which may have an associated award distribution probability. In some implementations, the associated award distribution probability may include the associations presented in the award distribution probability graph 500 of FIG. 5. In some implementations, quest award 530 may be a quest including new tasks. In some implementations the new task may include a challenge to fight another player's character at the same level, or the new task may include a well matched personal tournament of might in the content of the game.

In some implementations, new quest (e.g., 304 or any quest from an award distribution probability, e.g., any quest award of FIG. 5 i.e., 512, 520, 524, 530) may be accessed by a user via purchase of a probability item bundle 270 and a selection to start 404 the new quest. In some implementations, new quest 304 may be accessed after a purchase of the probability item bundle 270 and a selection to store or save for later 406 the probability item bundle 270 in inventory 250. In some implementations, new quest 304 may be accessed after a purchase of a probability item bundle 270 and a selection to open the probability item bundle and a selection to store or save for later 406 the new quest, which was a part of the opened probability item bundle 270.

In some implementations, a task of the new quest may be similar to or the same as a task of a universal quest of the online game. In some implementations, a task of the new quest may be different from a task of a universal quest of the online game. In some implementations, a task of the new quest may be one or more new tasks. In some implementations, the quest tool component 116 may create new quest after initial distribution of the online game has occurred.

In some implementations, the quest tool component 116 or the probability item bundle management component 114 may assign an individual probability to a new quest. In some implementations, the probability item bundle management component 114 may receive a new quest and an associated probability and may assign both to a set of potential awards and may assign the set of potential awards to an award distribution probability. In some implementations, the quest tool component 116 may perform these assignments.

In some implementations, the probability item bundle management component 114 may receive activation requests from users for purchased probability item bundles under user controlled inventories (e.g., 250), and stochastically distribute potential awards (e.g., 302) to the users in accordance with the award distribution probabilities (e.g., 502) associated with the potential awards. In some implementations, in response to receiving an activation request from the first user for the first probability item bundle (e.g., 270) subsequent to purchase of the first probability item bundle by the first user, the probability item bundle management component 114 may be configured to stochastically select one (e.g., 304) of the potential awards from the first set of potential awards (e.g., 302) in accordance with the award distribution probabilities (e.g., 502) associated with the potential awards. In some implementations, probability item bundle management component 114 may distribute the stochastically selected first potential award (e.g., 304) to the first user, and responsive to the selection and distribution of the first potential award to the first user, the first user may be provided with access to the first quest (e.g., 404) in the online game. In some implementations, the first quest may be a new quest.

Figure 7:
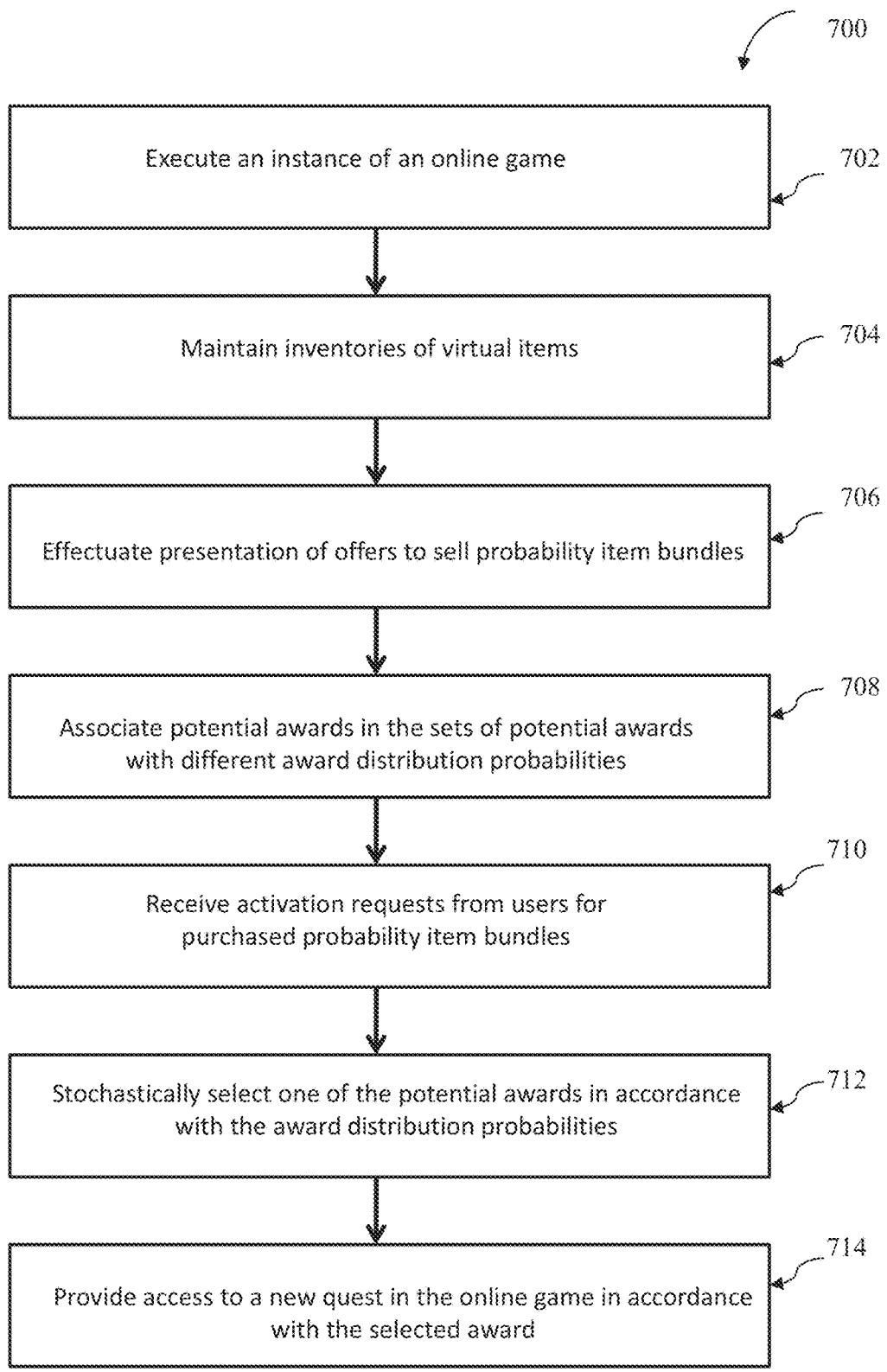
FIG. 7 illustrates a method of providing a quest from a probability item bundle in an online game, in accordance with some implementations.

FIG. 7 illustrates an example implementation of a method of providing a quest from a probability item bundle in an online game. The operations of method 700 presented below are intended to be illustrative. In some embodiments, method 700 may be accomplished with one or more additional operations not described, and/or without one or more of the operations discussed. Additionally, the order in which the operations of method 700 are illustrated in FIG. 7 and described below is not intended to be limiting.

In some embodiments, method 700 may be implemented in one or more processing devices (e.g., a digital processor, an analog processor, a digital circuit designed to process information, an analog circuit designed to process information, a state machine, and/or other mechanisms for electronically processing information). In some implementations, the one or more processing devices may include one or more devices executing some or all of the operations of method 700 in response to instructions stored electronically on an electronic storage medium. In some implementations, the one or more processing devices may include one or more devices configured through hardware, firmware, and/or software to be specifically designed for execution of one or more of the operations of method 700.

At an operation 702 an instance of an online game may be executed. The instance of the online game may facilitate participation of the user in the online game via a client computing platform 104. Facilitating participation in the online game may include executing actions in the instance of the online game in response to receiving action requests from the user. Operation 702 may be performed by a game component that is the same as or similar to game component 108, in accordance with one or more implementations.

At an operation 704 maintenance of inventories of virtual items including new quests or probability item bundles may be executed. Operation 704 may be performed by user inventory component that is the same as or similar to user inventory component 110, in accordance with one or more implementations.

At an operation 706, presentation of offers to sell probability item bundles may be effectuated. Operation 706 may be performed by a shop component that is the same as or similar to shop component 112, in accordance with one or more implementations.

At an operation 708, associating of potential awards in the sets of potential awards with different award distribution probabilities may be executed. Operation 708 may be performed by a probability item bundle management component that is the same as or similar to probability item bundle management component 114, in accordance with one or more implementations.

At an operation 710, receiving activation requests from users for purchased probability item bundles may be executed. Operation 710 may be performed by a probability item bundle management component that is the same as or similar to probability item bundle management component 114, in accordance with one or more implementations.

At an operation 712, stochastically selecting one of the potential awards in accordance with the award distribution probabilities may be executed. Operation 712 may be performed by a probability item bundle management component that is the same as or similar to probability item bundle management component 114, in accordance with one or more implementations.

At an operation 714, providing access to a first quest in an online game in accordance with the selected award may be executed. Operation 714 may be performed by a probability item bundle management component that is the same as or similar to probability item bundle management component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for providing a quest from a probability item bundle in an online game, the system comprising:
    one or more physical computer processors configured by machine-readable instructions to:
        execute an instance of the online game, and to implement the instance of the online game to facilitate participation of users in gameplay of the online game, via client computing platforms;
        maintain inventories of virtual items under control of the users, and to store associations between the users and the virtual items under their control;
        effectuate presentation to the users, through a shop interface, offers to sell probability item bundles, individual ones of the probability item bundles being associated, via the one or more physical computer processors, with sets of potential awards for the online game, the probability item bundles including a first probability item bundle being associated, via the one or more physical computer processors, with a first set of potential awards, the first set of potential awards including a first potential award and a second potential award, the first potential award including access to a first quest in the online game;
        wherein the potential awards in the sets of potential awards are associated, via the one or more physical computer processors, with different award distribution probabilities such that the first potential award is associated, via the one or more physical computer processors, with a first award distribution probability and the second potential award is associated with a second award distribution probability;
        wherein purchase of the probability item bundles by the users results in addition, via the one or more physical computer processors, of purchased probability item bundles to the inventories of the users such that responsive to purchase of the first probability item bundle by a first user, the first probability item bundle is added to a first inventory of virtual items under control of the first user; and
        receive activation requests from the users for the purchased probability item bundles under user controlled inventories, and to stochastically distribute the potential awards to the users in accordance with the award distribution probabilities associated with the potential awards such that, in response to receiving an activation request from the first user for the first probability item bundle subsequent to purchase of the first probability item bundle by the first user, one of the potential awards is stochastically selected from the first set of potential awards in accordance with the award distribution probabilities associated with the potential awards such that the first potential award is selected, and to distribute the stochastically selected first potential award to the first user, and wherein responsive to the selection and distribution of the first potential award to the first user, the first user is provided with access, via the one or more physical computer processors, to the first quest in the online game.

2. The system of claim 1 wherein the first quest includes game activity that directly impacts game content and game evolution within the executed instance of the online game.

3. The system of claim 1 wherein the access to the first quest is presented, via the one or more physical computer processors, as one of the potential awards from the first set of potential awards of the first probability item bundle having a presentation in the online game as a mystery box presentation.

4. The system of claim 1 wherein successful completion of gameplay criteria of the first quest results in items, prizes, and/or bonuses that cannot be obtained by completion of universal quests.

5. The system of claim 4 wherein the universal quests include game activity that serves as part of an online game tutorial, the tutorial including walkthrough instructions of the gameplay.

6. The system of claim 4 wherein the universal quests includes game actions of: quests resulting in a user leveling up a character or kingdom, quests that tell a story, or quests that introduce new features.

7. The system of claim 1 wherein the first quest includes game activity including attacking specific tiles, or engaging in a personal tournament of might, or building a certain building or troop.

8. The system of claim 1 wherein the purchase of the first probability item bundle includes completion of a microtransaction.

9. The system of claim 1 wherein the first quest includes additional game content and gameplay for one or more of low level, mid-level, and/or high level players.

10. The system of claim 1 wherein each of the quests is associated with a quest type, a quantity of quest type per online game, and an associated prize.

11. A computer-implemented method for providing a quest from a probability item bundle in an online game, the method being implemented in a computer system that includes one or more processors executing computer program components, the method comprising:
    executing an instance of the online game and implementing the instance of the online game to facilitate participation in the online game by users via client computing platforms;
    maintaining inventories of virtual items under control of the users, and storing associations between the users and the virtual items under their control;
    effectuating presentation to the users, through a shop interface, offers to sell probability item bundles, potential ones of the probability item bundles being associated with sets of potential awards for the online game, the probability item bundles including a first probability item bundle being associated with a first set of potential awards, the first set of potential awards including a first potential award and a second potential award, the first potential award including access to a first quest in the online game;
    associating the potential awards in the sets of potential awards with different award distribution probabilities such that the first potential award is associated with a first award distribution probability and the second potential award is associated with a second award distribution probability, and wherein purchasing of the probability item bundles by the users results in adding the purchased probability item bundles to the inventories of the users such that responsive to purchasing of the first probability item bundle by a first user, adding the purchased first probability item bundle to a first inventory of virtual items under control of the first user; and receiving activation requests from the users for the purchased probability item bundles under user controlled inventories, and stochastically distributing the potential awards to the users in accordance with the different award distribution probabilities associated with the potential awards such that, in response to receiving an activation request from the first user for the first probability item bundle subsequent to purchase of the first probability item bundle by the first user, stochastically selecting one of the potential awards from the first set of potential awards in accordance with the different award distribution probabilities associated with the potential awards such that the first potential award is selected, and distributing the stochastically selected first potential award to the first user, wherein responsive to the selection and distribution of the first potential award to the first user, providing the first user with access to the first quest from the first probability item bundle in the online game.

12. The method of claim 11 wherein the quest includes game activity that directly impacts game content and game evolution within the executed instance of the online game.

13. The method of claim 11 wherein the access to the first quest is presented as one of the potential awards from the first set of potential awards of the first probability item bundle having a presentation in the online game as a mystery box presentation.

14. The method of claim 11 wherein successful completion of gameplay criteria of the first quest results in items, prizes, and/or bonuses that cannot be obtained by completion of universal quests.

15. The method of claim 14 wherein the universal quests include game activity that serves as part of an online game tutorial, the tutorial including walkthrough instructions of the gameplay.

16. The method of claim 14 wherein the universal quests includes game actions of: quests resulting in a user leveling up a character or kingdom, quests that tell a story, or quests that introduce new features.

17. The method of claim 11 wherein the first quest includes gameplay activity including attacking specific tiles, or engaging in a personal tournament of might, or building a certain building or troop.

18. The method of claim 11 wherein the purchasing of the first probability item bundle includes completion of a microtransaction.

19. The method of claim 11 wherein the first quest includes additional game content and gameplay for one or more of low level, mid-level, and/or high level players.

20. The method of claim 11 wherein each of the quests is associated with a quest type, a quantity of quest type per online game, and an associated prize.

* * * * *